(12) United States Patent
Ishii et al.

(10) Patent No.: US 10,711,705 B2
(45) Date of Patent: Jul. 14, 2020

(54) OPERATION CONTROL METHOD AND UPGRADE METHOD FOR GAS TURBINE, AND SETTING CHANGE METHOD FOR GAS TURBINE CONTROL SYSTEM

(71) Applicant: Mitsubishi Hitachi Power Systems, Ltd., Kanagawa (JP)

(72) Inventors: Nobukazu Ishii, Kanagawa (JP); Keita Fujii, Kanagawa (JP); Atsushi Kakiuchi, Kanagawa (JP)

(73) Assignee: MITSUBISHI HITACHI POWER SYSTEMS, LTD, Kanagawa (JP)

( * ) Notice: Subject to any disclaimer, the term of this patent is extended or adjusted under 35 U.S.C. 154(b) by 294 days.

(21) Appl. No.: 15/769,606

(22) PCT Filed: Nov. 10, 2016

(86) PCT No.: PCT/JP2016/083389
§ 371 (c)(1),
(2) Date: Apr. 19, 2018

(87) PCT Pub. No.: WO2017/090446
PCT Pub. Date: Jun. 1, 2017

(65) Prior Publication Data
US 2018/0283288 A1    Oct. 4, 2018

(30) Foreign Application Priority Data

Nov. 24, 2015    (JP) .................................. 2015-228722

(51) Int. Cl.
*F02C 9/54*    (2006.01)
*F02C 7/228*   (2006.01)
(Continued)

(52) U.S. Cl.
CPC .................. *F02C 9/54* (2013.01); *F02C 3/04* (2013.01); *F02C 7/00* (2013.01); *F02C 7/057* (2013.01);
(Continued)

(58) Field of Classification Search
CPC ...... F02C 9/00; F02C 9/16; F02C 9/18; F02C 9/20; F02C 9/28; F02C 9/50; F02C 9/52;
(Continued)

(56) References Cited

U.S. PATENT DOCUMENTS 6,416,278 B1    7/2002  Caddell, Jr. et al.
7,610,746 B2   11/2009  Fujii et al.
(Continued)

FOREIGN PATENT DOCUMENTS

JP    2002-168133    6/2002
JP    2006-336464   12/2006
(Continued)

OTHER PUBLICATIONS

International Search Report dated Jan. 10, 2017 in International (PCT) Application No. PCT/JP2016/083389.
(Continued)

*Primary Examiner* — William H Rodriguez
(74) *Attorney, Agent, or Firm* — Wenderoth, Lind & Ponack, L.L.P.

(57) ABSTRACT

There is provided a method including: performing an upgrade of reducing a supply amount of cooling air supplied to a turbine and replacing at least some of components provided in the turbine with components adapted to the supply amount of cooling air; and changing a set value calculation function according to the post-upgrade supply amount of cooling air and the replaced components.

10 Claims, 8 Drawing Sheets

(51) Int. Cl.
  *F02C 7/057* (2006.01)
  *F02C 9/00* (2006.01)
  *F02C 9/28* (2006.01)
  *F02C 7/00* (2006.01)
  *F02C 3/04* (2006.01)
  *F02C 7/18* (2006.01)

(52) U.S. Cl.
  CPC .............. *F02C 7/18* (2013.01); *F02C 7/228* (2013.01); *F02C 9/00* (2013.01); *F02C 9/28* (2013.01); *F05D 2220/32* (2013.01); *F05D 2230/80* (2013.01); *F05D 2270/05* (2013.01); *F05D 2270/20* (2013.01); *F05D 2270/303* (2013.01); *F05D 2270/3015* (2013.01)

(58) Field of Classification Search
  CPC .... F02C 9/54; F02C 7/057; F02C 7/18; F02C 6/08; F05D 2270/301; F05D 2270/303
  See application file for complete search history.

(56) References Cited

U.S. PATENT DOCUMENTS

| | | | | |
|---|---|---|---|---|
| 2007/0079593 | A1* | 4/2007 | Fujii | F02C 7/1435 60/39.27 |
| 2007/0089395 | A1* | 4/2007 | Fujii | F02C 9/263 60/39.281 |
| 2007/0271024 | A1* | 11/2007 | Fujii | G05B 13/024 701/100 |
| 2013/0219910 | A1* | 8/2013 | Botarelli | F23R 3/346 60/776 |
| 2015/0142188 | A1 | 5/2015 | Terry et al. | |
| 2017/0159562 | A1* | 6/2017 | Takahashi | F02C 3/30 |
| 2017/0159576 | A1* | 6/2017 | Kraft | F02C 3/30 |
| 2017/0167300 | A1* | 6/2017 | Mathai | F01D 25/30 |
| 2017/0167389 | A1* | 6/2017 | Conchieri | F02C 6/18 |
| 2018/0209341 | A1* | 7/2018 | Nakahara | F02C 9/18 |
| 2018/0223743 | A1* | 8/2018 | Yamamoto | F02C 7/24 |

FOREIGN PATENT DOCUMENTS

| | | |
|---|---|---|
| JP | 2008-75578 | 4/2008 |
| JP | 4119908 | 5/2008 |
| JP | 2014-96037 | 5/2014 |
| JP | 2015-94268 | 5/2015 |
| JP | 2015-102096 | 6/2015 |

OTHER PUBLICATIONS

Notification of Reasons for Refusal dated May 25, 2016 in Japanese Application No. 2015-228722, with English translation.

* cited by examiner

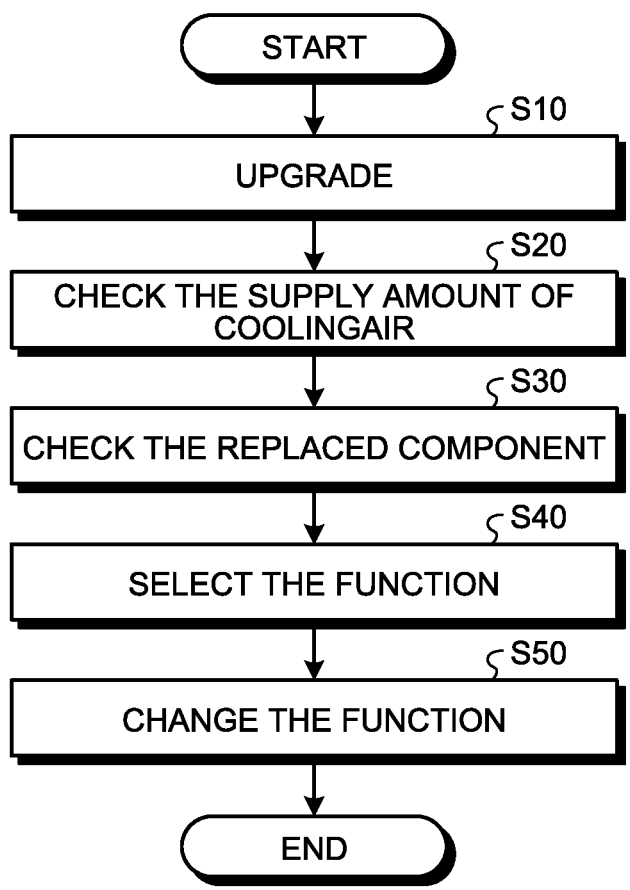

OPERATION CONTROL METHOD AND UPGRADE METHOD FOR GAS TURBINE, AND SETTING CHANGE METHOD FOR GAS TURBINE CONTROL SYSTEM

TECHNICAL FIELD

The present invention relates to an operation control method and an upgrade method for a gas turbine, and a setting change method for a gas turbine control system.

BACKGROUND ART

A gas turbine is composed of a compressor, a combustor, and a turbine. In the compressor, air taken in through an air intake opening is compressed into high-temperature, high-pressure compressed air, and in the combustor, fuel is supplied to this compressed air and the mixture is combusted to produce high-temperature, high-pressure combustion gas (working fluid). The turbine is driven by this combustion gas, and thereby a generator coupled to the turbine is driven. The combustion gas having driven the turbine is discharged as exhaust gas from the exhaust side of the turbine. The gas turbine further has a cooling air supply line through which cooling air is supplied to the turbine.

A control system that controls such a gas turbine executes temperature adjustment control that involves adjusting the amount of air taken into the compressor, the supply amount of fuel, the supply amount of cooling air, etc., and thereby controlling the operation of the gas turbine so that the turbine inlet temperature of the turbine into which the combustion gas flows does not exceed a preset upper limit temperature. For example, Patent Literature 1 describes a gas turbine control system that performs such temperature adjustment control. The operation control system for a gas turbine described in Patent Literature 1 adjusts the opening degree of an air intake valve (inlet guide vane), provided on the intake side of the compressor, to a larger opening degree as the gas turbine output increases.

CITATION LIST

Patent Literature

Patent Literature 1: Japanese Patent Laid-Open No. 2008-75578

SUMMARY OF INVENTION

Technical Problem

To improve the output and efficiency of a gas turbine, it has been proposed recently to perform an upgrade of reducing the supply amount of cooling air supplied to the turbine and increasing the supply amount of compressed air supplied to the combustor. When this upgrade is performed, components provided in the turbine, such as blades and vanes, are replaced with those that can be cooled with the reduced supply amount of cooling air.

However, the gas turbine after the upgrade has improved output and efficiency compared with before the upgrade, and therefore, for example, has a lower turbine inlet temperature at the same gas turbine output (or pressure ratio). Moreover, some turbine components are different between before and after the upgrade, which may affect the operation conditions of the gas turbine. Thus, performing the above upgrade may cause a difference in the operation conditions of the gas turbine between before and after the upgrade.

Having been contrived in view of the above problem, the present invention aims to provide an operation control method and an upgrade method for a gas turbine and a setting change method for a gas turbine control system that can avoid causing a difference in the operation conditions of the gas turbine between before and after an upgrade.

Solution to Problem

An operation control method for a gas turbine according to the present invention is an operation control method for a gas turbine including:

a compressor that compresses air supplied through an air supply line;

a combustor that is supplied with fuel and combusts compressed air compressed by the compressor;

a turbine that is rotated by combustion gas generated by the combustor;

a cooling air supply part that supplies part of the compressed air to the turbine as cooling air for the turbine; and an air intake valve that is provided in the air supply line and adjusts the amount of air supplied to the compressor, the operation control method including the steps of:

calculating an opening degree set value of the air intake valve relative to a measured output value that is a measurement result of an output of the gas turbine, on the basis of the measured output value and a first function defining a relation between the measured output value and the opening degree set value;

adjusting an opening degree of the air intake valve on the basis of the calculated opening degree set value; and when an upgrade of reducing a supply amount of the cooling air supplied to the turbine and replacing components provided in the turbine with components adapted to the supply amount of cooling air has been performed, changing the first function according to the post-upgrade supply amount of cooling air and the replaced components.

Thus, the first function is changed to a function that is in accordance with the post-upgrade supply amount of cooling air and the replaced components, so that the opening degree set value of the air intake valve is calculated appropriately according to the contents of the upgrade. It is therefore possible to avoid a difference in the turbine inlet temperature between before and after the upgrade, and to avoid causing a difference in the operation conditions of the gas turbine between before and after the upgrade.

The operation control method for a gas turbine according to the present invention further includes the steps of: obtaining a set temperature that is preset for exhaust gas discharged from the turbine, relative to a pressure ratio of the compressor, on the basis of the pressure ratio and a second function defining a relation between the pressure ratio and the set temperature; and when the upgrade has been performed, changing the second function to a function that is calculated from a first correction value and a second correction value, the first correction value corresponding to a further decrease in an exhaust gas temperature due to thermal expansion caused by a rise in the pressure ratio, the second correction value corresponding to a further rise in the exhaust gas temperature caused by a decrease in the supply amount of cooling air.

Thus, the second function is changed to a function that is in accordance with the post-upgrade supply amount of cooling air and the replaced components, so that an appropriate set temperature of the exhaust gas can be obtained. It is therefore possible to avoid causing a difference in the operation conditions of the gas turbine between before and after the upgrade.

The operation control method for a gas turbine of the present invention further includes a step of, on the basis of the set temperature that is calculated on the basis of the second function, correcting the opening degree set value that is calculated on the basis of the first function.

Thus, after the upgrade is performed, the opening degree set value is corrected on the basis of an appropriate set temperature, which makes it possible to more reliably avoid causing a difference in the operation conditions of the gas turbine between before and after the upgrade.

In the operation control method for a gas turbine of the present invention, the gas turbine has a plurality of fuel supply lines through which the fuel is supplied to the combustor, and the operation control method further includes a step of calculating a control variable corresponding to a turbine inlet temperature, on the basis of an intake air temperature that is a measurement result of the temperature of the air supplied through the air supply line, and on the basis of a third function defining a relation between the intake air temperature and the output of the gas turbine, and then setting a distribution ratio of the amount of fuel supplied to the plurality of fuel supply lines on the basis of the calculated control variable.

Thus, after the upgrade is performed, the control variable is calculated using a calculated value that is calculated on the basis of the function having been changed according to the supply amount of cooling air and the replaced components, so that the distribution ratio of the amount of fuel supplied to the plurality of fuel supply lines can be set more appropriately.

The operation control method for a gas turbine of the present invention further includes a step of, when the upgrade has been performed, changing the third function according to the post-upgrade supply amount of cooling air and the replaced components.

Thus, after the upgrade is performed, a more appropriate control variable is calculated, which makes it possible to more reliably avoid causing a difference in the operation conditions of the gas turbine between before and after the upgrade.

In the operation control method for a gas turbine of the present invention, the changed first function is set so that the turbine inlet temperature when the gas turbine performs a partial-load operation at an output lower than a rated output remains the same before and after the upgrade.

Thus, it is possible to reliably avoid causing a difference in the operation conditions of the gas turbine between before and after the upgrade also when the gas turbine performs a partial-load operation.

In the operation control method for a gas turbine of the present invention, the components include at least one of a plurality of blades and a plurality of vanes that are provided in the turbine.

Thus, it is possible to reliably avoid causing a difference in the operation conditions of the gas turbine between before and after the upgrade when at least one of the blades and the vanes has been replaced.

An upgrade method for a gas turbine according to the present invention is an upgrade method for a gas turbine including:
a compressor that compresses air supplied through an air supply line;
a combustor that is supplied with fuel and combusts compressed air compressed by the compressor;
a turbine that is rotated by combustion gas generated by the combustor;
a cooling air supply part that supplies part of the compressed air to the turbine as cooling air for the turbine;
an air intake valve that is provided in the air supply line and adjusts an amount of air supplied to the compressor; and
a control system that calculates an opening degree set value of the air intake valve relative to a measured output value that is a measurement result of a gas turbine output, on the basis of the measured output value and a first function defining a relation between the measured output value and the opening degree set value, and adjusts an opening degree of the air intake valve on the basis of the calculated opening degree set value,
the upgrade method including:
performing an upgrade of reducing a supply amount of the cooling air supplied to the turbine and replacing at least some of components provided in the turbine with components adapted to the supply amount of cooling air; and
changing the first function according to the post-upgrade supply amount of cooling air and the replaced components.

Thus, after the upgrade is performed, the first function is changed according to the supply amount of cooling air and the replaced components, so that the opening degree set value of the air intake valve is calculated appropriately according to the contents of the upgrade. It is therefore possible to avoid causing a difference in the operation conditions of the gas turbine between before and after the upgrade, as well as to efficiently perform the upgrade.

A setting change method for a gas turbine control system according to the present invention is a setting change method for a gas turbine control system that controls a gas turbine including:
a compressor that compresses air supplied through an air supply line;
a combustor that is supplied with fuel and combusts compressed air compressed by the compressor;
a turbine that is rotated by combustion gas generated by the combustor;
a cooling air supply part that supplies part of the compressed air to the turbine as cooling air for the turbine; and
an air intake valve that is provided in the air supply line and adjusts the amount of air supplied to the compressor,
the gas turbine control system calculating an opening degree set value of the air intake valve relative to a measured output value that is a measurement result of an output of the gas turbine, on the basis of the measured output value and a first function defining a relation between the measured output value and the opening degree set value, and adjusting an opening degree of the air intake valve on the basis of the calculated opening degree set value,
the setting change method including, when an upgrade of reducing a supply amount of the cooling air supplied to the turbine and replacing at least some of components provided in the turbine with components adapted to the supply amount of cooling air has been performed, changing the first function according to the post-upgrade supply amount of cooling air and the replaced components.

Thus, after the upgrade is performed, the first function is changed according to the supply amount of cooling air and the replaced components, so that the opening degree set value of the air intake valve is calculated appropriately according to the contents of the upgrade. It is therefore possible to avoid causing a difference in the operation conditions of the gas turbine between before and after the upgrade, as well as to efficiently change the settings of the gas turbine control system.

Advantageous Effects of Invention

According to the present invention, it is possible to avoid causing a difference in the operation conditions of a gas turbine between before and after an upgrade.

BRIEF DESCRIPTION OF DRAWINGS

FIG. 11 is a flowchart showing an example of a gas turbine upgrade method.

DESCRIPTION OF EMBODIMENTS

In the following, an embodiment according to the present invention will be described in detail on the basis of the drawings. However, the present invention is not limited by this embodiment. Components in the following embodiment include those that can be easily substituted by persons skilled in the art or those that are substantially the same. It is possible to appropriately combine the components described below, and if there are a plurality of embodiments, it is also possible to combine these embodiments.

Figure 1:
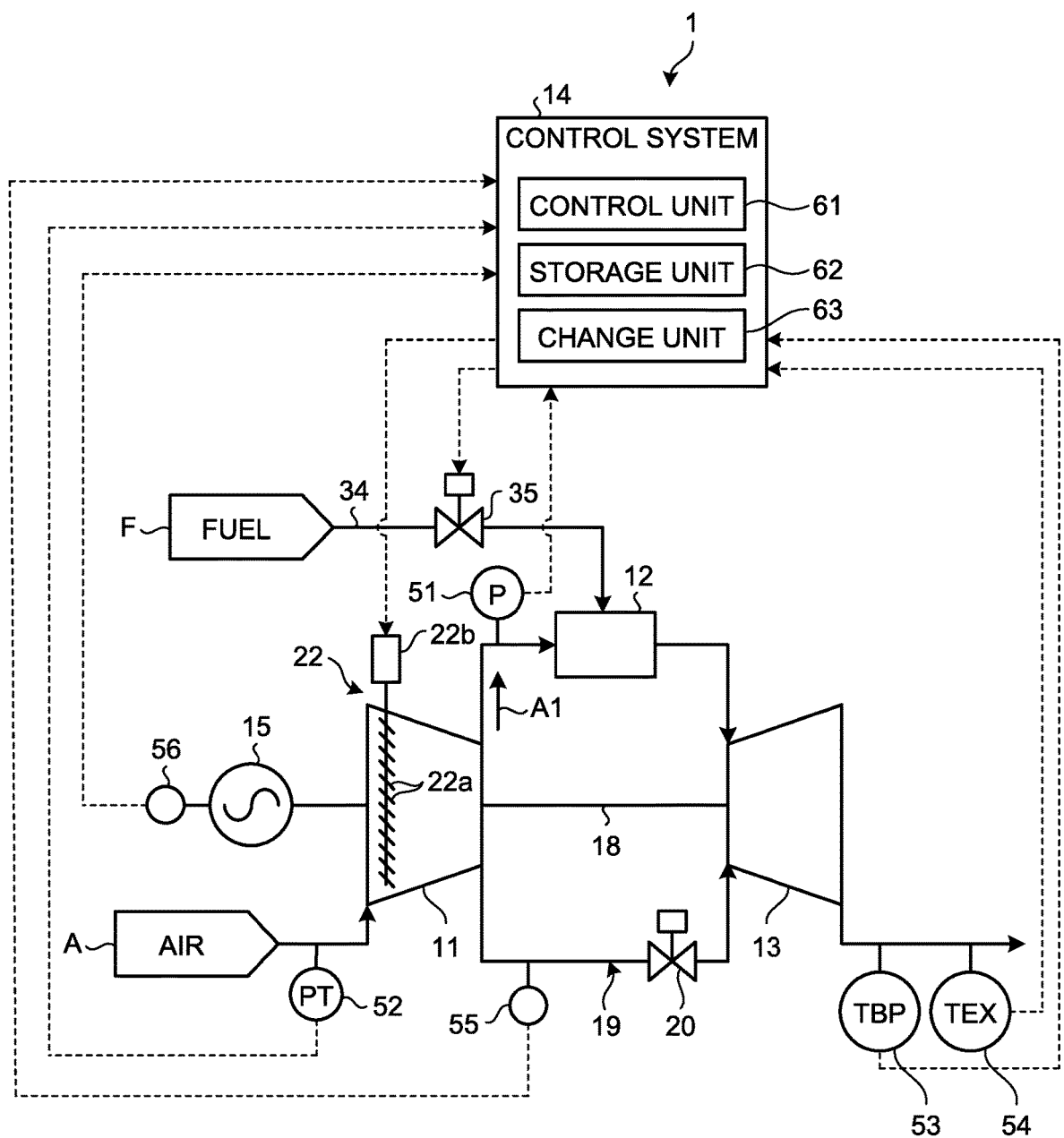
FIG. 1 is a schematic view showing a gas turbine according to an embodiment.

FIG. 1 is a schematic view showing a gas turbine according to this embodiment. As shown in FIG. 1, a gas turbine 1 according to this embodiment includes a compressor 11, a combustor 12, and a turbine 13. A rotor 18 is disposed so as to extend through central parts of the compressor 11, the combustor 12, and the turbine 13, and the compressor 11 and the turbine 13 are coupled together through the rotor 18 so as to be integrally rotatable. The gas turbine 1 is controlled by a control system 14. The gas turbine 1 can generate electric power with a generator 15 coupled thereto. The gas turbine 1 further has a cooling air supply line 19 through which cooling air is supplied from the compressor 11 to the turbine 13. A cooling air control valve 20 is provided in the cooling air supply line 19.

The compressor 11 compresses air A, taken in through an air intake opening, into compressed air A1. An inlet guide vane (IGV; air intake valve) 22 that adjusts the intake amount of air A taken in through the air intake opening is disposed in the compressor 11. As the opening degree of the inlet guide vane 22 is adjusted, the intake amount of air A is adjusted. Specifically, the inlet guide vane 22 has a plurality of vane bodies 22a, and an IGV actuator 22b that changes the vane angle of the plurality of vane bodies 22a. As the vane angle of the vane bodies 22a is adjusted by the IGV actuator 22b, the opening degree of the inlet guide vane 22 is adjusted and thereby the intake amount of air A is adjusted. When the opening degree of the inlet guide vane 22 is increased, the intake amount of air A increases, so that the pressure ratio of the compressor 11 increases. Conversely, when the opening degree of the inlet guide vane 22 is reduced, the intake amount of air A decreases, so that the pressure ratio of the compressor 11 decreases.

Figure 2:
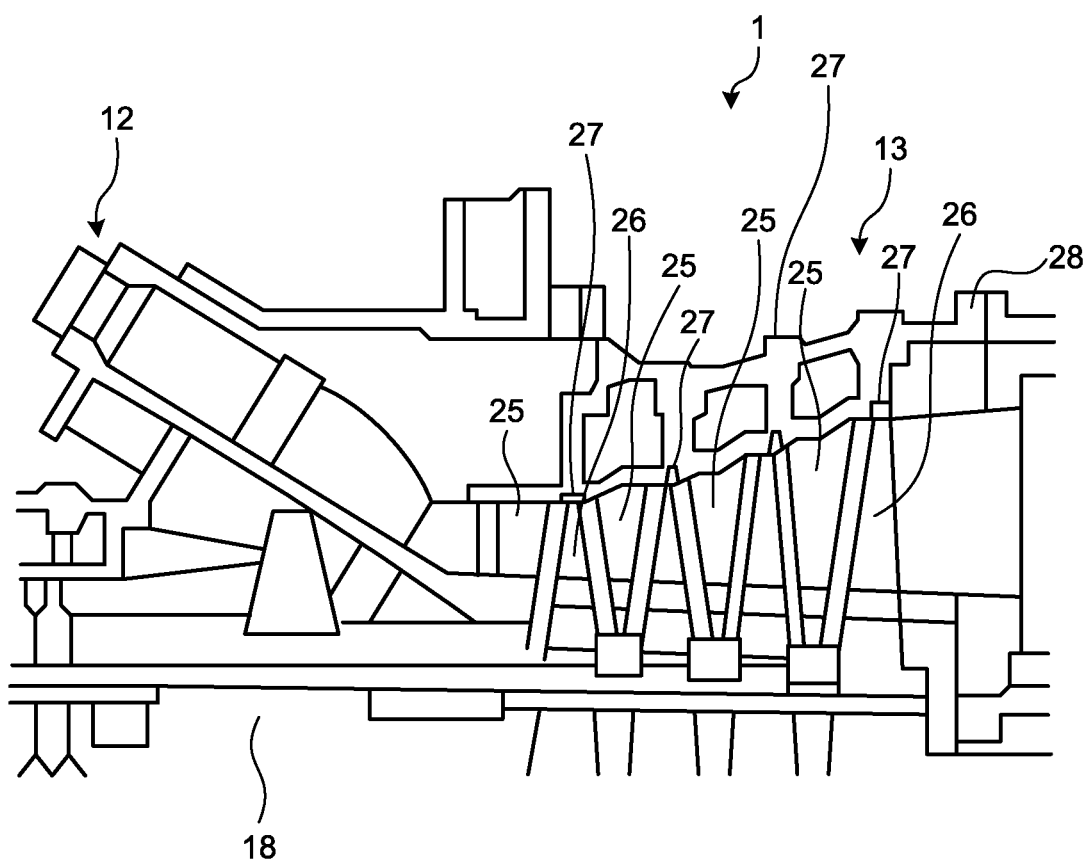
FIG. 2 is a view schematically showing the configuration of a part of a turbine.

The combustor 12 supplies fuel F to the compressed air A1 compressed by the compressor 11, and mixes and combusts the compressed air A1 and the fuel F to generate combustion gas. The turbine 13 is rotated by the combustion gas generated by the combustor 12. FIG. 2 is a view schematically showing the configuration of a part of the turbine 13 of the gas turbine 1. As shown in FIG. 2, the turbine 13 has the rotor 18, a plurality of stages of vanes 25, and a plurality of stages of blades 26. The vanes 25 in each stage are mounted on a casing 28. The blades 26 in each stage are fixed on an outer circumference of the rotor 18. The plurality of stages of vanes 25 and the plurality of stages of blades 26 are provided alternately in an axial direction of the rotor 18. Ring segments 27 are provided on the casing 28. The ring segments 27 are provided on a radially outer side of the blades 26 with a clearance thereto. The vanes 25 and the ring segments 27 are disposed with a clearance therebetween in the axial direction of the rotor 18.

The rotor 18 is rotatably supported by bearings (not shown) at both ends in the axial direction, and is provided so as to be rotatable around a shaft center. A driving shaft of the generator 15 is coupled to the end of the rotor 18 on the side of the compressor 11. The generator 15 is provided so as to be coaxial with the turbine 13, and can generate electric power as the turbine 13 rotates.

Thus, the air A taken in through the air intake opening of the compressor 11 is compressed into the high-temperature, high-pressure compressed air A1 by passing through the inside of the compressor 11 via the inlet guide vane 22. The fuel F is supplied from the combustor 12 to the compressed air A1, and the compressed air A1 and the fuel F are mixed and combusted to generate high-temperature, high-pressure combustion gas. The high-temperature, high-pressure combustion gas generated in the combustor 12 passes through the inside of the turbine 13, thereby actuating (rotating) the turbine 13 and driving the rotor 18 to rotate, which in turn drives the generator 15 coupled to the rotor 18. Thus, the generator 15 coupled to the rotor 18 generates electric power by being driven to rotate. Meanwhile, the combustion gas having driven the turbine 13 has its heat recovered and is released as exhaust gas into the atmosphere.

To improve the output and efficiency, an upgrade of reducing the supply amount of cooling air supplied to the turbine 13 and increasing the supply amount of compressed air supplied to the combustor 12 is sometimes performed on the gas turbine 1. When this upgrade is performed, components provided in the turbine 13, such as the blades and the vanes, are replaced with those that can be cooled with the reduced supply amount of cooling air.

In the upgrade of the gas turbine 1, the components of the turbine 13, for example, the vanes 25, the blades 26, and the ring segments 27 may be replaced. In this embodiment, a case where the first-stage and second-stage vanes 25 and the first-stage and second-stage blades 26 among the components of the turbine 13 are replaced with new components when the gas turbine 1 is upgraded will be described as an example. However, the components to be replaced are not limited to this example, and components may be replaced in other combinations.

As shown in FIG. 1, the gas turbine 1 is provided with a casing pressure indicator 51, an intake air state detector 52, a blade path temperature indicator 53, an exhaust gas temperature indicator 54, and a flowmeter 55. The casing pressure indicator 51 is provided in a line through which the compressed air A1 flows from the compressor 11 toward the combustor 12, specifically, provided inside a casing of the combustor 12, and measures the pressure of the compressed air A1 (casing pressure). The intake air state detector 52 detects the intake air temperature and the intake air pressure of the air A taken into the compressor 11. The blade path temperature indicator 53 is provided in a line through which the exhaust gas discharged from the turbine 13 flows, and measures the temperature of the exhaust gas having passed through the last-stage blades that are provided in the turbine 13 on a downstream side in a flow direction of the exhaust gas. The exhaust gas temperature indicator 54 is provided on the downstream side of the blade path temperature indicator 53, and measures the temperature of the exhaust gas. The flowmeter 55 measures the flow rate of the cooling air flowing through the cooling air supply line 19. The gas turbine 1 is further provided with an output meter 56 that detects the output (load) of the gas turbine 1. Measurement signals from the casing pressure indicator 51, the intake air state detector 52, the blade path temperature indicator 53, the exhaust gas temperature indicator 54, the flowmeter 55, and the output meter 56 are input into the control system 14.

The control system 14 has a control unit 61, a storage unit 62, and a change unit 63. The control unit 61 controls the operation of the gas turbine 1 by controlling the inlet guide adjustment vane 22, fuel adjustment valves 35, etc. on the basis of measurement results of the casing pressure indicator 51, the intake air state detector 52, the blade path temperature indicator 53, the exhaust gas temperature indicator 54, the flowmeter 55, etc. Moreover, the control unit 61 controls the operation of the gas turbine 1 according to the output of the gas turbine 1 (the output of the generator 15). The control unit 61 makes the gas turbine 1 perform a partial-load operation and a full-load operation. The full-load operation is an operation in which the output of the gas turbine 1 reaches a rated output. The partial-load operation is an operation in which the output of the gas turbine 1 remains lower than the rated output.

To adjust the supply amount of fuel F, the control unit 61 executes fuel control that involves controlling the fuel adjustment valves 35 provided in fuel supply lines 34 through which the fuel F is supplied to the combustor 12. The fuel supply lines 34 include a plurality of supply lines, for example, a main fuel supply line, a pilot fuel supply line, and a top-hat fuel supply line. The fuel adjustment valves 35 are provided respectively in the plurality of supply lines, and the opening degrees of the fuel adjustment valves 35 can be individually controlled. The control unit 61 controls the fuel adjustment valves 35 and thereby adjusts the supply amount and the distribution of the fuel F supplied (injected) to the compressed air A1.

Figure 3:
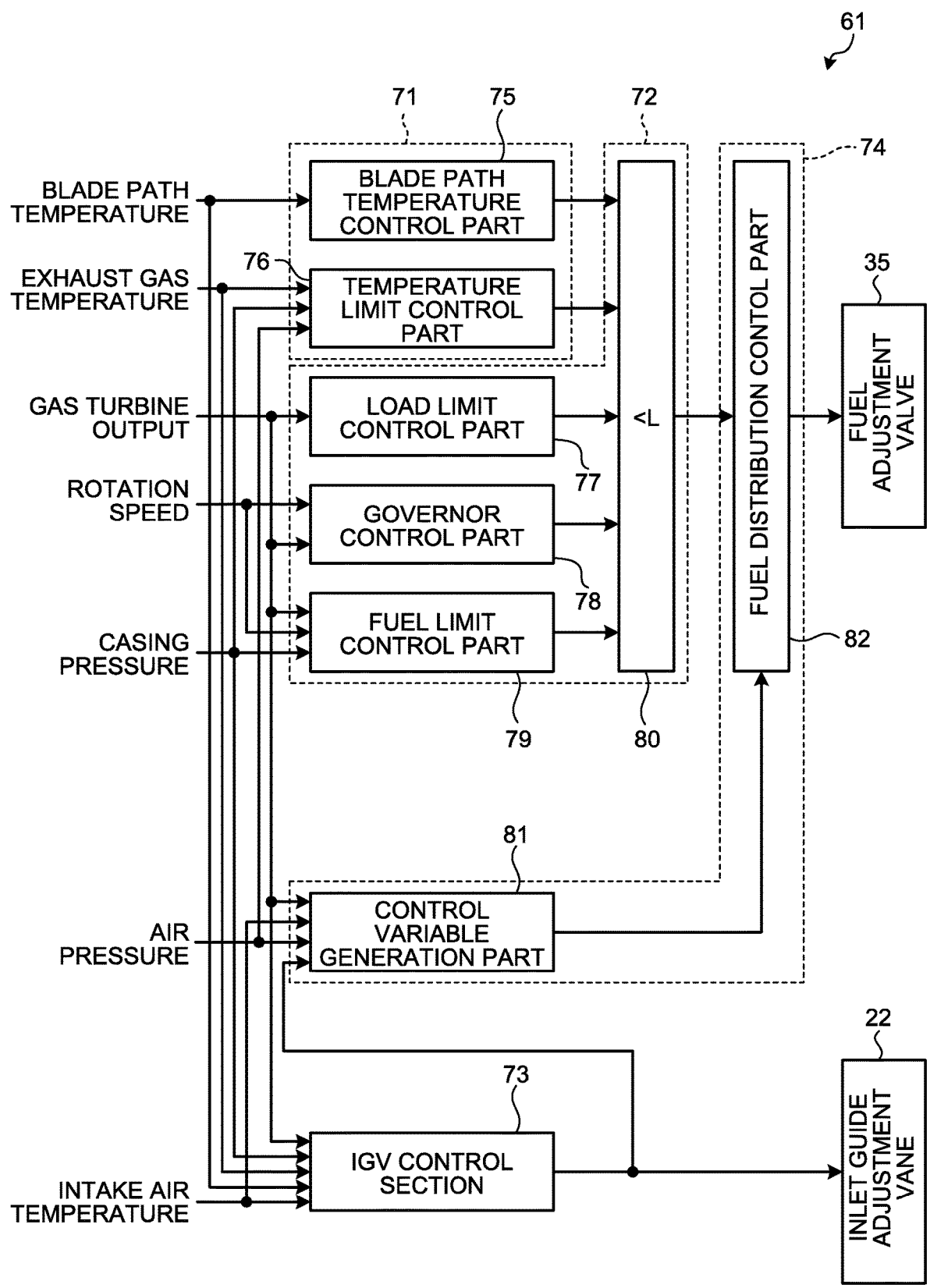
FIG. 3 is a block diagram showing the configuration of a control unit.

FIG. 3 is a block diagram showing the configuration of the control unit 61. As shown in FIG. 3, the control unit 61 has an exhaust gas temperature control section 71, a combustion control section 72, an IGV control section 73, and a combustion load control section 74.

The exhaust gas temperature control section 71 sets a relation between an exhaust gas temperature and a pressure ratio so that the turbine inlet temperature is kept at a predetermined temperature. The exhaust gas temperature control section 71 has a blade path temperature control part 75 and a temperature limit control part 76. The blade path temperature measured by the blade path temperature indicator 53 is input into the blade path temperature control part 75. The blade path temperature control part 75 generates a blade path temperature set value on the basis of the blade path temperature, and outputs the blade path temperature set value to a low-value selection part 80 to be described later.

The pressure inside a casing of the compressor 11 (casing pressure) measured by the casing pressure indicator 51, the intake air pressure measured by the intake air state detector 52, and the measured value of the exhaust gas temperature measured by the exhaust gas temperature indicator 54 are input into the temperature limit control part 76. The temperature limit control part 76 outputs an exhaust gas temperature set value on the basis of these input values.

Figure 4:
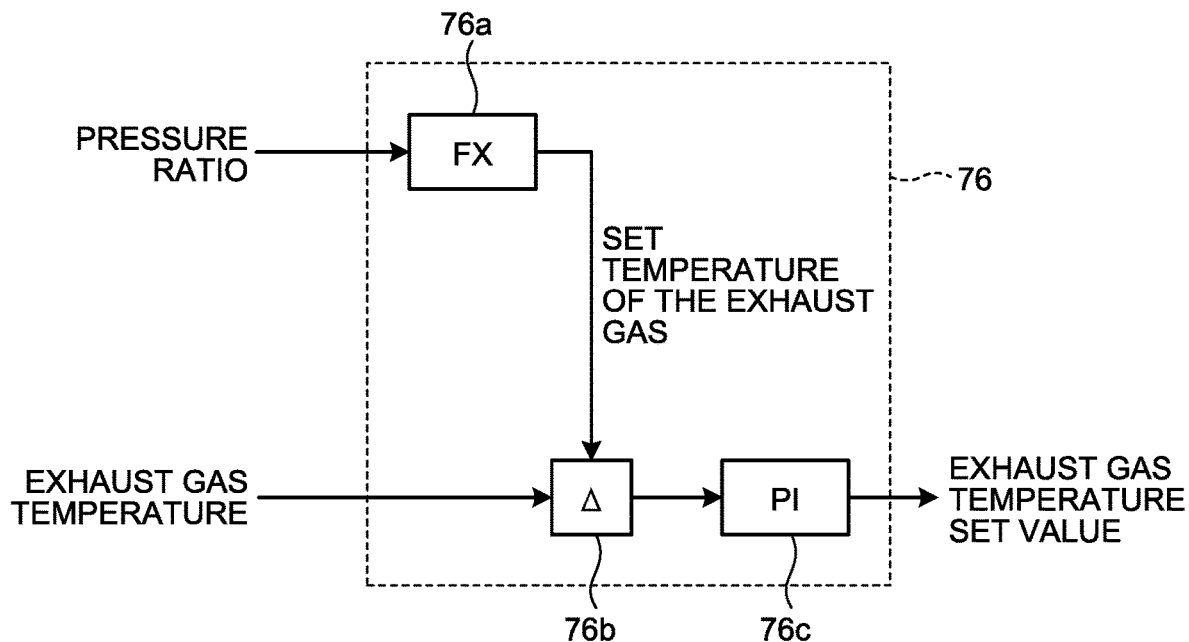
FIG. 4 is a block diagram showing an example of a temperature limit control part.

FIG. 4 is a block diagram showing an example of the temperature limit control part 76. As shown in FIG. 4, the temperature limit control part 76 has a controller 76a, a subtractor 76b, and a PI controller 76c. The pressure ratio used to calculate the exhaust gas temperature set value is input into the controller 76a. The pressure ratio is a ratio between the casing pressure and the intake air pressure (casing pressure/intake air pressure). The value of the pressure ratio input into the controller 76a is a value that is set as a target value to calculate the exhaust gas temperature set value. The controller 76a calculates a set temperature of the exhaust gas (hereinafter written as an exhaust gas set temperature) relative to the input pressure ratio on the basis of the input pressure ratio and a set temperature calculation function (second function), and outputs the calculated set temperature to the subtractor 76b. The set temperature calculation function will be described later. The controller 76a outputs the calculated exhaust gas set temperature also to a subtractor 73g provided in the IGV control section 73 to be described later.

Figure 5:
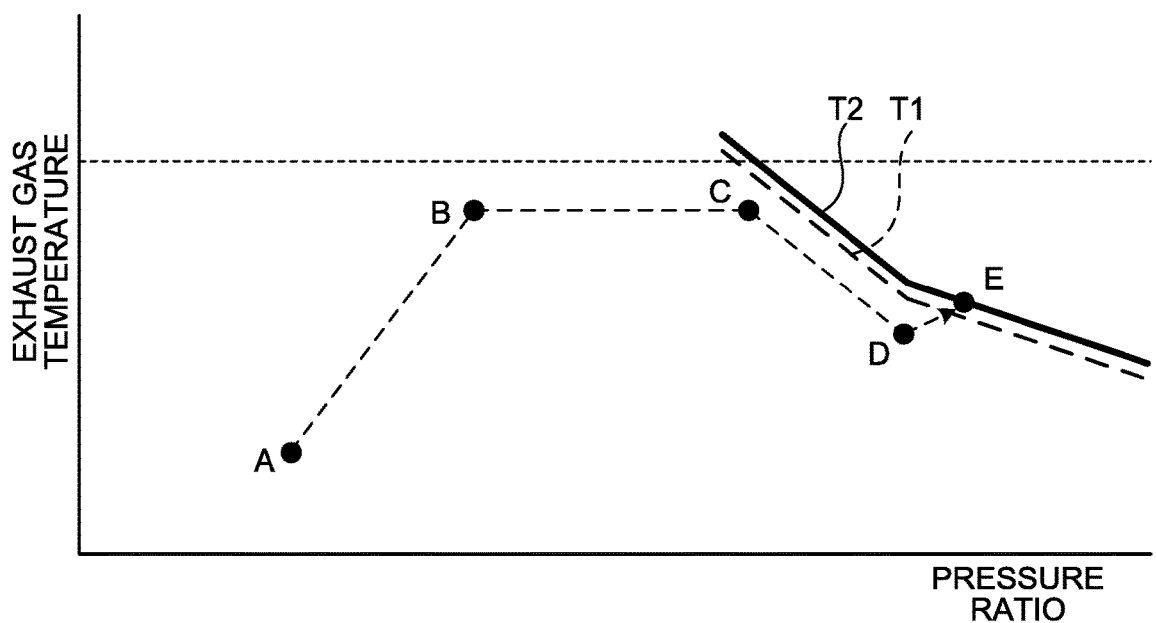
FIG. 5 is a graph showing a relation between a pressure ratio and an exhaust gas temperature upper limit value.

Here, the set temperature calculation function will be described. FIG. 5 is a graph showing a relation between the pressure ratio and the exhaust gas set temperature. In FIG. 5, the pressure ratio and the exhaust gas temperature are shown respectively on the horizontal axis and the vertical axis. As shown in FIG. 5, the set temperature calculation function defines the relation between the pressure ratio and the exhaust gas set temperature, and for example, is represented as rated temperature adjustment lines T1, T2. The rated temperature adjustment lines T1, T2 are lines indicating an exhaust gas temperature, relative to a predetermined pressure ratio, that is set so that the gas turbine 1 can achieve rated performance when the turbine inlet temperature has reached a rated value. The term "rated performance" refers to such performance of the gas turbine 1 that the work efficiency becomes optimum when a predetermined load is given to the gas turbine 1 by the generator 15. The rated temperature adjustment lines T1, T2 are set so that the turbine inlet temperature does not exceed a preset upper limit temperature. As shown by the rated temperature adjustment lines T1, T2, the exhaust gas set temperature decreases as the pressure ratio increases.

The point A to the point E in FIG. 5 represent points on an operation line of the gas turbine 1. The point A indicates the pressure ratio and the exhaust gas temperature at the time when a load is put on the gas turbine 1. The point B indicates the pressure ratio and the exhaust gas temperature at the time when the inlet guide vane 22 starts to be opened. The period from the point B to the point C is a control period in which the exhaust gas temperature remains constant relative to an increase in the pressure ratio in the process of increasing the opening degree of the inlet guide vane. The period from the point C to the point D is a period in which the opening degree of the inlet guide vane 22 is increased, and the inlet guide vane 22 is fully opened at the point D. The point E indicates the pressure ratio and the exhaust gas temperature in the case where the operation line reaches the rated temperature adjustment line as the load on the gas turbine 1 is increased from the point D toward 100%. When the gas turbine 1 performs a full-load operation, to bring the turbine inlet temperature close to the upper limit temperature, the operation of the gas turbine is controlled so that the exhaust gas temperature is close to the rated temperature adjustment line. In a partial-load operation of the gas turbine 1, to secure the responsiveness of the gas turbine output to load fluctuations, for example, the exhaust gas temperature is controlled to be lower than the rated temperature adjustment line so that the exhaust gas temperature is not limited by the upper limit temperature on the rated temperature adjustment line. Accordingly, the turbine inlet temperature is lower in a partial-load operation than in a full-load operation.

The rated temperature adjustment line T1 depicted by the dashed line in FIG. 5 shows an example of the set temperature calculation function that is used for the configuration of the gas turbine 1 before the upgrade is performed. The rated temperature adjustment line T2 depicted by the solid line in FIG. 5 shows an example of the set temperature calculation function that is used for the configuration of the gas turbine 1 after the upgrade is performed. As a result of the upgrade of the gas turbine 1, the supply amount of cooling air decreases and the pressure ratio inside the casing 2 increases. Accordingly, the pressure ratio and the exhaust gas set temperature at the point E on the post-upgrade rated temperature adjustment line T2 are higher than those on the pre-upgrade rated temperature adjustment line T1. In the case where the pressure ratio has been raised from that on the rated temperature adjustment line T1, this rise in the exhaust gas set temperature can be obtained as a sum (temperature adjustment biasing change amount) of the rise in the exhaust gas set temperature due to the decrease in the supply amount of cooling air and of the decrease in the exhaust gas set temperature due to the rise in the pressure ratio.

Figure 6:
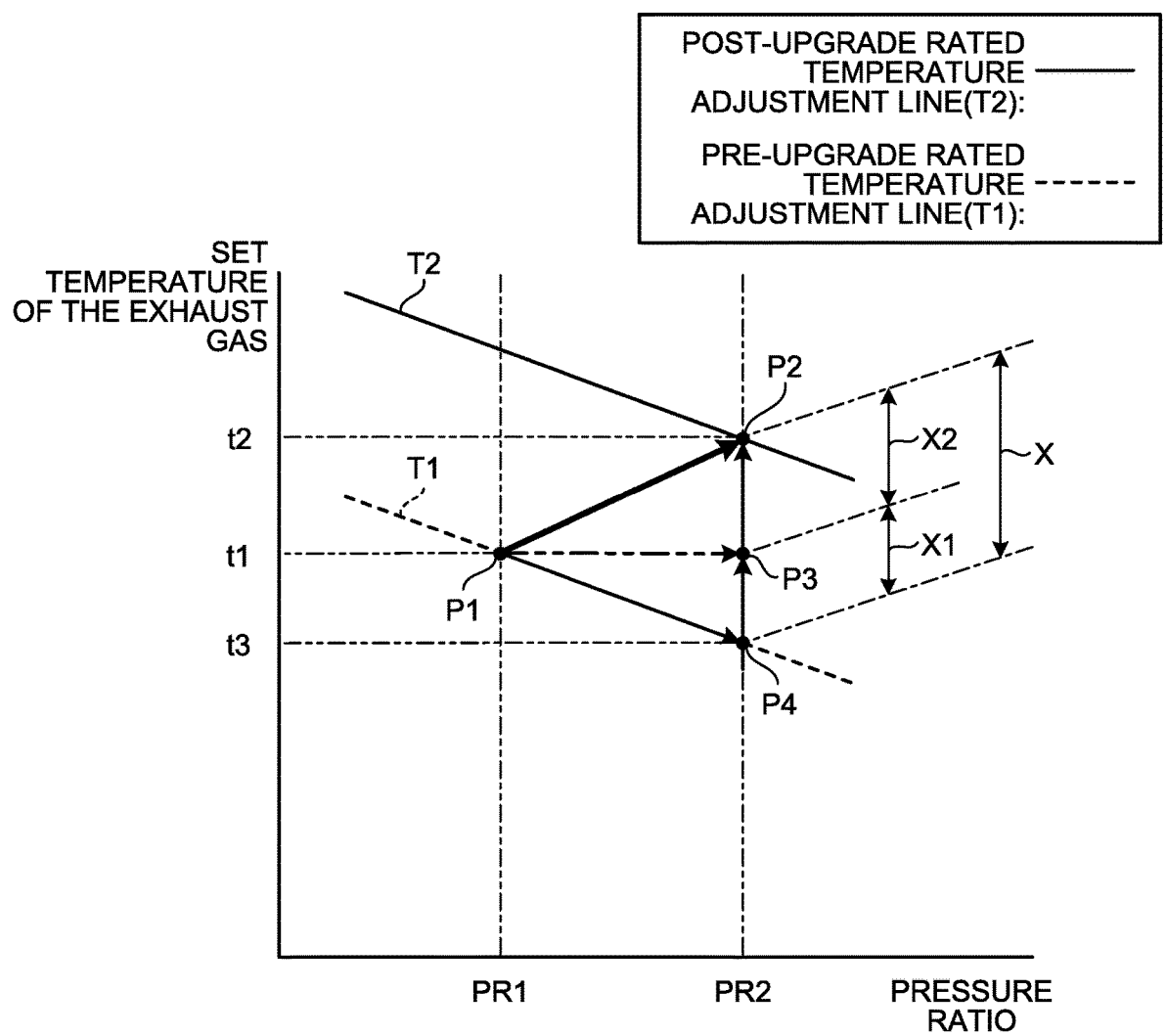
FIG. 6 is a view showing a relation between an exhaust gas set temperature and the pressure ratio on rated temperature adjustment lines.

A specific calculation method of the temperature adjustment biasing change amount will be described below using FIG. 6. FIG. 6 is a view showing a relation between the exhaust gas set temperature and the pressure ratio on the rated temperature adjustment lines, and shows a comparison between the rated temperature adjustment line T1 and the rated temperature adjustment line T2 respectively before and after the upgrade of the gas turbine 1. The pressure ratio and the exhaust gas set temperature are shown respectively on the horizontal axis and the vertical axis. Here, the term "temperature adjustment biasing change amount" means a change amount X of the exhaust gas temperature relative to the same pressure ratio when the pre-upgrade rated temperature adjustment line T1 has changed to the rated temperature adjustment line T2 as a result of the upgrade of the gas turbine 1. In FIG. 6, an operating point on the pre-upgrade rated temperature adjustment line T1 is denoted by P1, and this operating point is considered to have moved to P2 after the upgrade. The pressure ratio and the exhaust gas set temperature at the operating point P1 are denoted respectively by PR1 and t1, and the pressure ratio at the operating point P2 is denoted by PR2. The point on the rated temperature adjustment line T1 at the pressure ratio PR2 is denoted by P4, and the corresponding exhaust gas set temperature is denoted by t3. The point determined by the pressure ratio PR2 and the exhaust gas set temperature t1 is denoted by P3.

The rated temperature adjustment line represents the relation between the exhaust gas set temperature and the pressure ratio on the condition that the turbine inlet temperature is constant, and is aimed at controlling the turbine inlet temperature by monitoring the exhaust gas temperature. Typically, in the process of the combustion gas undergoing thermal expansion from the casing pressure to the atmospheric pressure in the turbine 13 of the gas turbine 1, the combustion gas temperature decreases due to the thermal expansion. Accordingly, the rated temperature adjustment line is a downward-sloping line with the exhaust gas set temperature decreasing as the pressure ratio increases under the condition that the turbine inlet temperature is constant.

As described above, when the gas turbine 1 has been upgraded, the pressure ratio inside the casing 2 rises due to the decrease in the supply amount of cooling air. Thus, the higher the pressure ratio inside the casing 2, the higher the rate at which the exhaust gas temperature decreases due to thermal expansion. In FIG. 6, the operating point of the gas turbine 1 can be considered to move, as a result of the upgrade of the gas turbine 1, from the operating point P1 (pressure ratio PR1) on the pre-upgrade rated temperature adjustment line T1 to the operating point P2 (pressure ratio PR2) on the post-upgrade rated temperature adjustment line T2. All the points P2, P3, P4 described above are points at the pressure ratio PR2, and the point P3 is also present on the segment P2P4.

As shown in FIG. 6, it can be conveniently considered that, as a result of the upgrade of the gas turbine 1, the pre-upgrade operating point P1 moves to the point P4 due to the increase in the pressure ratio resulting from the upgrade, and reaches the operating point P2 due to an increase in the exhaust gas temperature corresponding to the temperature adjustment biasing change amount X in the process of moving from the point P4 to the operating point P2.

When the pressure ratio is PR2, the temperature adjustment biasing change amount X is represented by the segment P2P4. Here, when the segment P2P4 is divided into the segment P3P4 and the segment P2P3 and these segments are defined respectively as variables X1, X2, the temperature adjustment biasing change amount X can be calculated by a formula [X=X1+X2]. Specifically, the temperature adjustment biasing change amount X in the process of the operating point changing from P1 to P2 as a result of the upgrade of the gas turbine 1 can be conveniently explained by being divided into the variable X1 corresponding to the further decrease in the exhaust gas temperature occurring in the process in which the pressure ratio of the combustion gas increases and the exhaust gas temperature decreases, and the variable X2 corresponding to the further rise in the exhaust gas temperature occurring in the process in which the exhaust gas temperature increases as the supply amount of cooling air decreases.

When the pressure ratio inside the casing 2 is increased from PR1 to PR2 as a result of the upgrade of the gas turbine 1, the exhaust gas temperature further decreases due to thermal expansion in the turbine 13 than before the upgrade. The variable X1 corresponds to this further decrease in the exhaust gas temperature caused by the increase in the pressure ratio. Specifically, in FIG. 6, when the pressure ratio inside the casing 2 has increased from PR1 before the upgrade to PR2 after the upgrade, the exhaust gas temperature decreases from the pre-upgrade exhaust gas set temperature t1 to t3 due to thermal expansion of the combustion gas in the turbine 13. The variable X1 is the further decrease in the exhaust gas temperature, and corresponds to a correction amount for bringing the exhaust gas temperature t3 to the pre-upgrade exhaust gas temperature t1. The temperature difference X1 between the point P3 and the point P4 is calculated by a formula [X1=t1−t3].

Next, the variable X2 corresponding to the decrease in the supply amount of cooling air will be described. As a result of the upgrade of the gas turbine 1, the supply amount of cooling air supplied to the components of the turbine 13 decreases, so that the amount of cooling air discharged from these components to a combustion gas flow passage decreases, and thus the temperature of the combustion gas flowing through the combustion gas flow passage rises from the pre-upgrade combustion gas temperature. Moreover, when components on the downstream side are upgraded, the amount of cooling air discharged from these components decreases, so that the combustion gas temperature on the downstream side of these downstream-side components further rises from the pre-upgrade temperature. Through repetition of this process, the temperature of the exhaust gas finally discharged from the turbine 13 rises from the pre-upgrade temperature. The process in which the combustion gas temperature rises due to the decrease in the supply amount of cooling air resulting from the upgrade is represented by the segment P2P3, and can be regarded as a correction amount corresponding to the variable X2.

The process in which the operating point moves from the point P1 via the point P4 to the point P3 as the exhaust gas temperature decreases due to thermal expansion caused by the increase in the pressure ratio, and the process in which the operating point moves from the point P3 to the point P2 as the exhaust gas temperature increases due to the decrease in the supply amount of cooling air, progress at the same time. Thus, the actual change of the operating point can be regarded as the change from the point P1 to the point P2. Therefore, when the operating point has moved from P1 to P2 as a result of the upgrade of the gas turbine 1, the correction amount for correcting the rated temperature adjustment line T1 to the rated temperature adjustment line T2 can be considered as the temperature adjustment biasing change amount X, i.e., a correction amount obtained by adding up the correction amount (first correction value) corresponding to the variable X1 that is the further decrease in the exhaust gas temperature due to the increase in the pressure ratio, and the correction amount (second correction value) corresponding to the variable X2 that is the further rise in the exhaust gas temperature due to the decrease in the supply amount of cooling air.

Accordingly, the rated temperature adjustment line T2 is a line obtained by raising the pressure ratios on the rated temperature adjustment line T1 and adding the temperature adjustment biasing change amount thereto, and thus is a line obtained by moving the rated temperature adjustment line T1 in parallel toward the upper right side in FIG. 6. Other than the rated temperature adjustment lines T1, T2 shown in FIG. 5, a plurality of patterns of functions are set for the set temperature calculation function, according to the post-upgrade supply amount of cooling air and to the locations and types of the vanes 25, the blades 26, and the ring segments 27 to be replaced in the upgrade. For example, these plurality of patterns of functions may be stored as a data table in the storage unit 62, or may be stored in an external storage device. The controller 76a is set so that one function from this data table is used.

As shown in FIG. 4, the measured value of the exhaust gas temperature and the exhaust gas set temperature are input into the subtractor 76b. The subtractor 76b generates a deviation Δ between the exhaust gas temperature and the exhaust gas set temperature, and outputs the deviation Δ to the PI controller 76c. The deviation Δ is input into the PI controller 76c. The PI controller 76c outputs such an exhaust gas temperature set value as makes the deviation Δ zero. Thus, during a static state in a partial-load operation or a full-load operation, the temperature limit control part 76 feedback-controls the operation of the gas turbine 1 so that the exhaust gas temperature measured by the exhaust gas temperature indicator 54 (measured exhaust gas temperature) matches the set temperatures indicated by the rated temperature adjustment lines T1, T2.

As shown in FIG. 3, the combustion control section 72 has a load limit control part 77, a governor control part 78, a fuel limit control part 79, and the low-value selection part 80. The gas turbine output as the actual output value of the gas turbine 1 is input into the load limit control part 77. The load limit control part 77 generates a fuel command value that orders the supply amount (fuel flow rate) of the fuel F supplied to the combustor 12 so that the gas turbine output matches a predetermined value. The load limit control part 77 outputs the generated fuel command value to the low-value selection part 80.

The gas turbine output and the rotation speed of the rotor 18 are input into the governor control part 78. The governor control part 78 generates a fuel command value on the basis of the gas turbine output and the rotation speed of the rotor 18 so that the rotation speed of the rotor 18 matches a set rotation speed that is preset. The governor control part 78 outputs the generated fuel command value to the low-value selection part 80.

The gas turbine output, the rotation speed of the rotor 18, and the casing pressure are input into the fuel limit control part 79. The fuel limit control part 79 generates a fuel command value on the basis of the gas turbine output, the rotation speed of the rotor 18, and the casing pressure so that the amount of fuel F supplied to the combustor 12 does not exceed a limit supply amount that is preset. The fuel limit control part 79 outputs the generated fuel command value to the low-value selection part 80.

The low-value selection part 80 selects a fuel command value having the lowest value of the fuel command values input from the above-described blade path temperature control part 75, temperature limit control part 76, load limit control part 77, governor control part 78, and fuel limit control part 79. The low-value selection part 80 outputs the selected fuel command value having a low value to a fuel distribution control part 82 to be described later.

The exhaust gas set temperature generated by the temperature limit control part 76 is input into the IGV control section 73. Moreover, the casing pressure, the blade path temperature, the exhaust gas temperature, the gas turbine output, and the intake air temperature are input into the IGV control section 73. On the basis of these input values, the IGV control section 73 generates an IGV opening degree command value for controlling the opening degree of the inlet guide vane 22. The IGV control section 73 outputs the generated IGV opening degree command value to the IGV actuator 22b.

Figure 7:
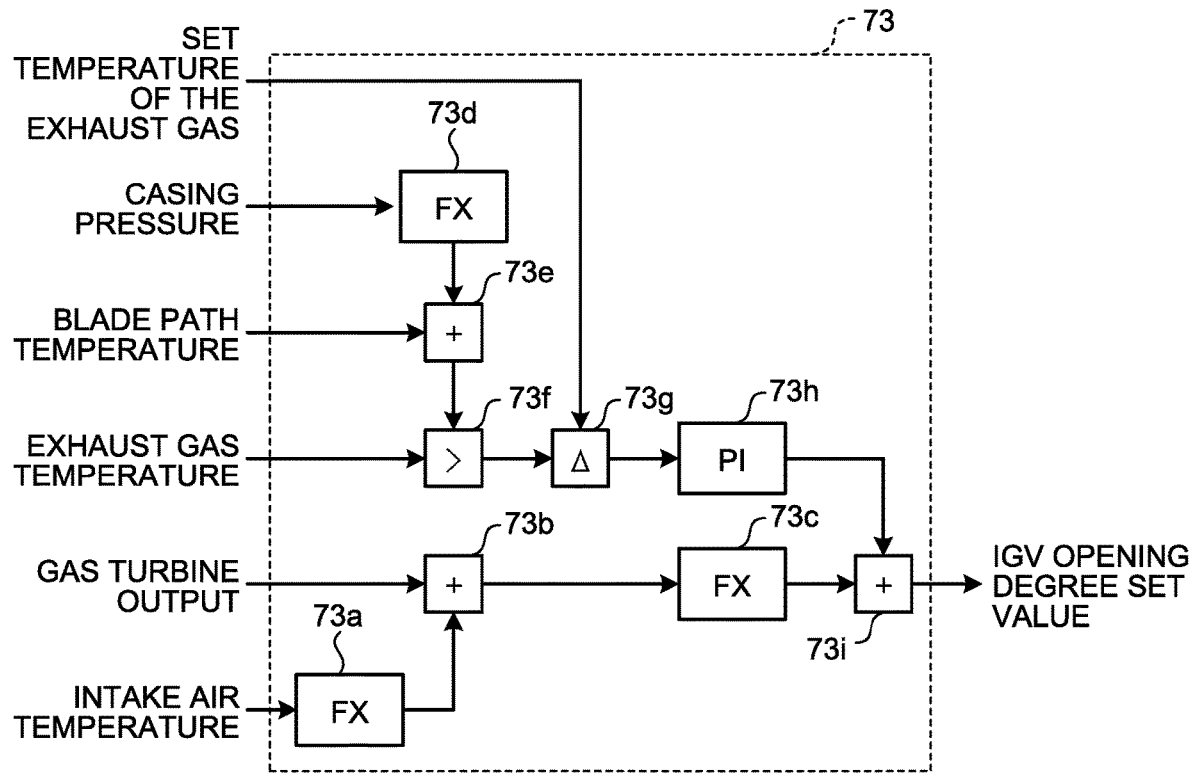
FIG. 7 is a block diagram showing an example of an IGV control section.

FIG. 7 is a block diagram showing an example of the IGV control section 73. As shown in FIG. 7, the IGV control section 73 has a controller 73a, an adder 73b, a controller 73c, a controller 73d, an adder 73e, a high-value selector 73f, a subtractor 73g, a PI controller 73h, and an adder 73i.

The intake air temperature is input into the controller 73a. The controller 73a generates a correction value for correcting the gas turbine output on the basis of this intake air temperature, and outputs the correction value to the adder 73b. The gas turbine output and the correction value output from the controller 73a are input into the adder 73b. The adder 73b calculates a corrected gas turbine output by adding up the gas turbine output and the correction value, and outputs the corrected gas turbine output to the controller 73c.

The gas turbine output that is output from the adder 73b is input into the controller 73c. The controller 73c calculates an IGV opening degree set value relative to the input gas turbine output on the basis of the gas turbine output and an IGV opening degree calculation function (first function), and outputs the IGV opening degree set value to the adder 73i.

Figure 8:
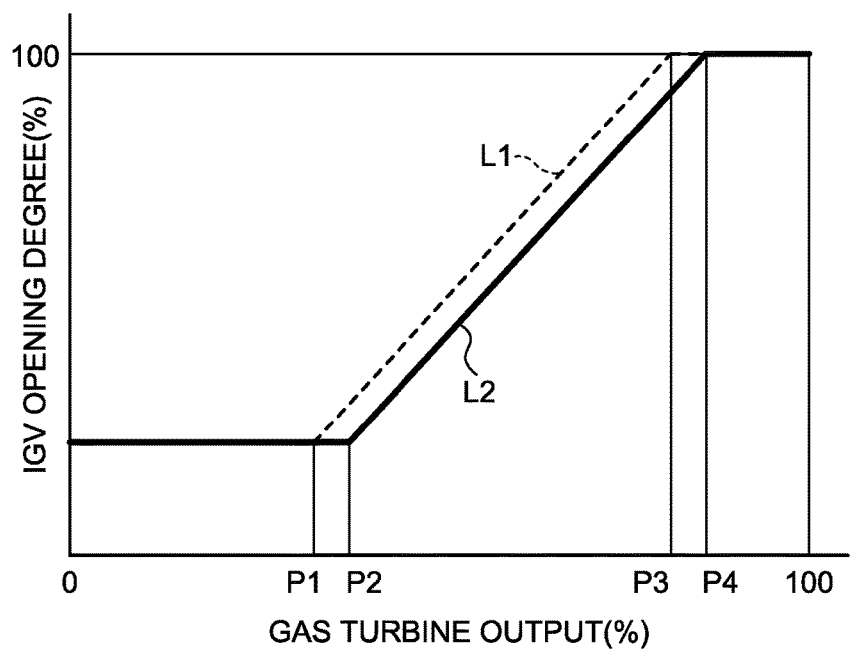
FIG. 8 is a graph showing a relation between a gas turbine output and an IGV opening degree set value.

Here, the IGV opening degree calculation function will be described. FIG. 8 is a graph showing a relation between the gas turbine output and the IGV opening degree set value. In FIG. 8, the gas turbine output and the IGV opening degree set value are shown respectively on the horizontal axis and the vertical axis. As shown in FIG. 8, the IGV opening degree calculation function is a function defining the relation between the gas turbine output and the IGV opening degree set value, and is represented by curved lines L1, L2. As shown by the curved lines L1, L2, the IGV opening degree increases as the gas turbine output increases beyond the outputs P1, P2, and becomes constant after the gas turbine output reaches the outputs P3, P4. However, the curved lines L1, L2 are not limited to the forms shown in FIG. 8, and for example, these curved lines may include a period in which the IGV opening degree set value decreases in the process in which the gas turbine output increases.

The curved line L1 depicted by the dashed line in FIG. 8 shows an example of the IGV opening degree calculation function that is used for the configuration of the gas turbine 1 before the upgrade is performed. The curved line L2 depicted by the solid line in FIG. 8 shows an example of the IGV opening degree calculation function that is used for the configuration of the gas turbine 1 after the predetermined upgrade is performed thereon. When the gas turbine output is between the output P1 and the output P4, the IGV opening degree relative to the same gas turbine output is smaller on the post-upgrade curved line L2 than on the pre-upgrade curved line L1. Other than the curved lines L1, L2 shown in FIG. 8, a plurality of patterns of functions are set for the IGV opening degree calculation function, according to the post-upgrade supply amount of cooling air and to the locations and types of the vanes 25, the blades 26, and the ring segments 27 to be replaced in the upgrade. For example, these plurality of patterns of functions may be stored as a data table in the storage unit 62, or may be stored in an external storage device. The controller 73c is set so that one function from this data table is used.

As shown in FIG. 7, the casing pressure is input into the controller 73d. The controller 73d calculates a bias value for the blade path temperature on the basis of the input casing pressure, and outputs the bias value to the adder 73e. This bias value is a value for correcting the measured value of the blade path temperature measured by the blade path temperature indicator 53.

The measured value of the blade path temperature measured by the blade path temperature indicator 53 and the bias value output from the controller 73d are input into the adder 73e. The adder 73e calculates a blade path temperature by adding up the measured value of the blade path temperature and the bias value, and outputs the calculated blade path temperature to the high-value selector 73f.

The exhaust gas temperature measured by the exhaust gas temperature indicator 54 and the blade path temperature output from the adder 73e are input into the high-value selector 73f. The high-value selector 73f selects a higher value (temperature) of the input exhaust gas temperature and blade path temperature, and outputs the selected temperature to the subtractor 73g.

The exhaust gas set temperature output from the controller 76a of the temperature limit control part 76 and the temperature output from the high-value selector 73f are input into the subtractor 73g. The subtractor 73g generates a deviation $\Delta$ between the temperature output from the high-value selector 73f and the exhaust gas set temperature, and outputs the deviation $\Delta$ to the PI controller 73h. The deviation $\Delta$ is input into the PI controller 73h. The PI controller 73h calculates such a correction value for the IGV opening degree set value as makes the deviation $\Delta$ zero, and outputs this correction value to the adder 73i.

The IGV opening degree set value output from the controller 73c and the correction value for the IGV opening degree set value output from the PI controller 73h are input into the adder 73i. The adder 73i calculates a corrected IGV opening degree set value by adding up the input IGV opening degree set value and correction value, and outputs the corrected IGV opening degree set value to the IGV actuator 22b and a control variable generation part 81 to be described later.

Next, as shown in FIG. 3, the combustion load control section 74 controls the ratio of the fuel supplied to the plurality of fuel supply lines 34, for example. The combustion load control section 74 has the control variable generation part 81 and the fuel distribution control part 82.

The gas turbine output, the intake air temperature, the IGV opening degree set value, and the intake air pressure are input into the control variable generation part 81. The control variable generation part 81 generates a control variable corresponding to the turbine inlet temperature on the basis of these input values, and outputs the control variable to the fuel distribution control part 82. This control variable is a value that is used to calculate an opening degree command value for each of the fuel adjustment valves 35 respectively provided in the plurality of fuel supply lines 34. The control variable is a non-dimensional value of the temperature of the combustion gas flowing from the combustor 12 into the turbine 13 (turbine inlet temperature; TIT), and is a value corresponding to the turbine inlet temperature.

Here, a procedure of calculating the control variable will be described. The following description assumes that the control variable corresponding to a case where the turbine inlet temperature is a first reference temperature Ta in a no-load operation is 0%, and that the control variable in a case where the turbine inlet temperature is a second reference temperature Tb higher than the first reference temperature Ta is 100%. For example, the first reference temperature Ta can be set to approximately 700° C. For example, the second reference temperature Tb can be set to approximately 1500° C. However, the set values of the first reference temperature Ta and the second reference temperature Tb are not limited to these examples, and for example, can be set to different values for different gas turbines 1.

The control variable (to be written as CLCSO) can be expressed by the following Formula 1:

$$CLCSO = 100 \times (\text{Gas turbine output} - Pa)/(Pb - Pa) \quad \text{(Formula 1)},$$

where Pa is the gas turbine output at the first reference temperature Ta, and Pb is the gas turbine output at the second reference temperature Tb.

Figure 9:
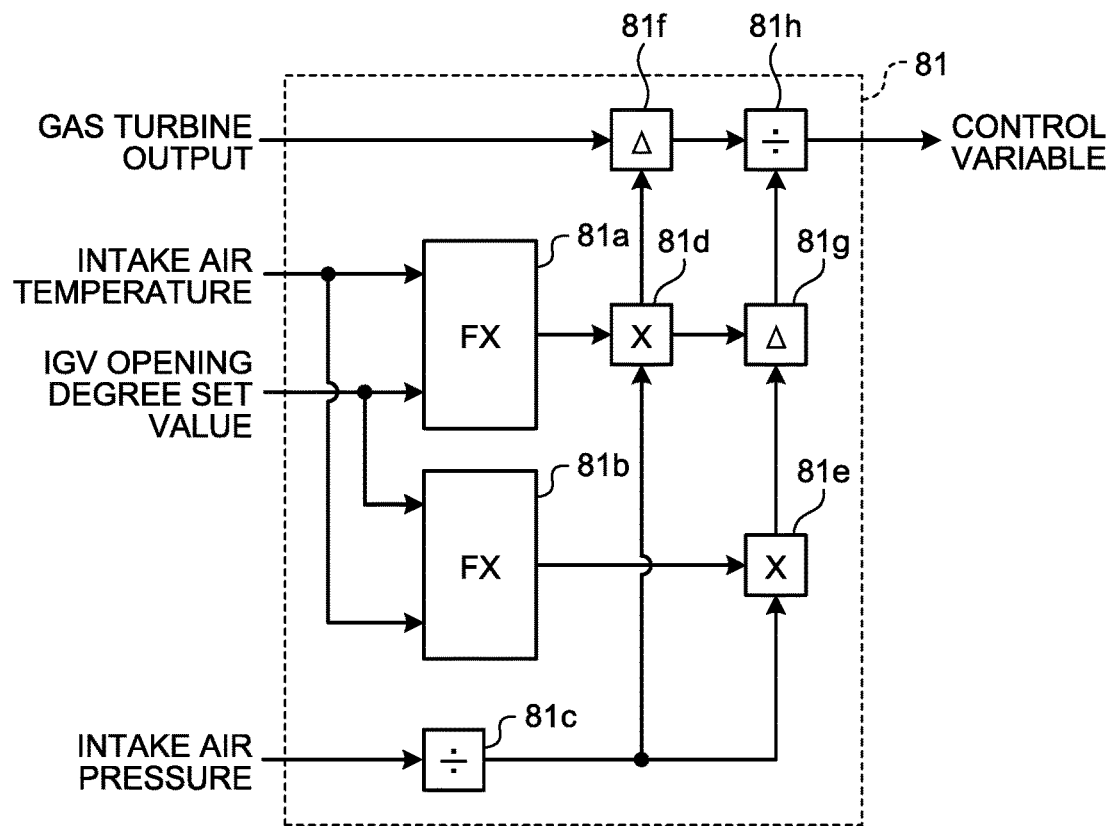
FIG. 9 is a block diagram showing an example of a control variable generation part.

FIG. 9 is a block diagram showing an example of the control variable generation part 81. As shown in FIG. 9, the control variable generation part 81 has a controller 81a, a controller 81b, a divider 81c, a multiplier 81d, a multiplier 81e, a subtractor 81f, a subtractor 81g, and a divider 81h.

The intake air temperature and the IGV opening degree set value are input into the controllers 81a, 81b. The controller 81a calculates the value of Pa on the basis of the intake air temperature, the IGV opening degree set value, and an output calculation function, and outputs the value of Pa to the multiplier 81d. The controller 81b calculates the value of Pb on the basis of the intake air temperature, the IGV opening degree set value, and the output calculation function, and outputs the value of Pb to the multiplier 81e.

The relation between the gas turbine output and CLCSO varies according to the IGV opening degree, the intake air temperature of the compressor 11, etc. Specifically, when the gas turbine output is the same, the value of CLCSO decreases as the IGV opening degree increases. When the gas turbine output is the same, the value of CLCSO increases as the intake air temperature of the compressor 11 increases. Therefore, the controllers 81a, 81b calculate the values of Pa and Pb for each intake air temperature and each IGV opening degree set value.

Figure 10:
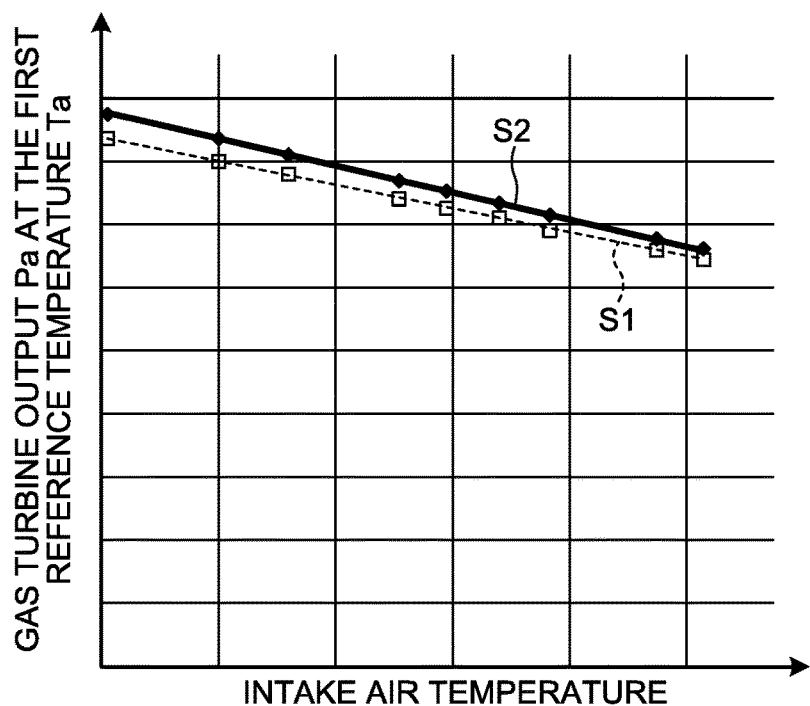
FIG. 10 is a graph showing a relation between an intake air temperature and the gas turbine output.

Here, the output calculation function will be described. FIG. 10 is a graph showing a relation between the intake air temperature and the gas turbine output. In FIG. 10, the intake air temperature and the gas turbine output are shown respectively on the horizontal axis and the vertical axis. The output calculation function defines relations among the IGV opening degree, the intake air temperature, and the gas turbine output. Therefore, the form of the output calculation function used in the control variable generation part 81 may be, for example, a collection of functions that are functions defining the relation between the intake air temperature and the gas turbine output and provided respectively for the IGV opening degrees, or a collection of functions that are functions defining the relation between the IGV opening degree and the gas turbine output and provided respectively for the intake air temperatures. FIG. 10 shows an example of a part of the output calculation function, and shows the relation between the intake air temperature and the gas turbine output at the first reference temperature Ta for a predetermined IGV opening degree by straight lines S1, S2. As shown by the straight lines S1, S2, in this case, the gas turbine output decreases as the intake air temperature increases.

The straight line S1 depicted by the dashed line in FIG. 10 shows an example of the output calculation function that is used for the configuration of the gas turbine 1 before the upgrade is performed. The straight line S2 depicted by the solid line in FIG. 10 shows an example of the output calculation function that is used for the configuration of the gas turbine 1 after the predetermined upgrade is performed thereon. The gas turbine output relative to the same intake air temperature is higher on the post-upgrade straight line S2 than on the pre-upgrade straight line S1. Other than the straight lines S1, S2 shown in FIG. 10, a plurality of patterns of functions are set for the output calculation function, according to the post-upgrade supply amount of cooling air and to the locations and types of the vanes 25, the blades 26, and the ring segments 27 to be replaced in the upgrade. For example, these plurality of patterns of functions may be stored as a data table in the storage unit 62, or may be stored in an external storage device. The controllers 81a, 81b are set so that functions according to the IGV opening degree and the intake air temperature from this data table are used.

The intake air pressure is input into the divider 81c. The divider 81c divides the intake air pressure by a standard atmospheric pressure, and outputs an atmospheric pressure ratio (intake air pressure/standard atmospheric pressure) that is the division result to the multipliers 81d, 81e.

The value of Pa output from the controller 81a and the atmospheric pressure ratio output from the divider 81c are input into the multiplier 81d. The multiplier 81d multiplies these input values and outputs, to the subtractors 81f, 81g, a value of Pa that is the multiplication result and takes the atmospheric pressure ratio into account. The value of Pb output from the controller 81b and the atmospheric pressure ratio output from the divider 81c are input into the multiplier 81e. The multiplier 81e multiplies these input values and outputs, to the subtractor 81g, a value of Pb that is the multiplication result and takes also the atmospheric pressure ratio into account.

The value of Pa output from the multiplier 81d and the value of Pb output from the multiplier 81e are input into the subtractor 81g. The subtractor 81g subtracts the value of Pa from the value of Pb (Pb−Pa; see Formula 1). The gas turbine output and the value of Pa obtained by the multiplier 81d are input into the subtractor 81f. The subtractor 81f subtracts the value of Pa from the gas turbine output (Gas turbine output−Pa; see Formula 1).

The output value from the subtractor 81f and the output value from the subtractor 81g are input into the divider 81h. The divider 81h calculates a control variable by dividing the output value from the subtractor 81f by the output value from the subtractor 81g (see Formula 1), and outputs this control variable to the fuel distribution control part 82.

As shown in FIG. 3, the fuel command value output from the low-value selection part 80 and the control variable output from the divider 81h of the control variable generation part 81 are input into the fuel distribution control part 82. The fuel distribution control part 82 calculates the amount and ratio of the fuel supplied to the plurality of fuel supply lines 34 on the basis of the input fuel command value and control variable. The fuel distribution control part 82 sets an opening degree set value of the fuel adjustment valve 35 in each fuel supply line 34 on the basis of the calculation result, and controls the opening degree of each fuel adjustment valve 35 on the basis of the opening degree set value.

The storage unit 62 stores various programs, data, etc. related to the operation of the gas turbine 1. For example, the storage unit 62 stores the plurality of patterns of functions used in the control unit 61 such as the above-described set temperature calculation function, IGV opening degree calculation function, and output calculation function. The change unit 63 changes the set temperature calculation function, the IGV opening degree calculation function, and the output calculation function that are used to control the gas turbine 1, according to the post-upgrade supply amount of cooling air and the types and locations of the replaced components. To change these functions, the change unit 63 changes them by selecting from the patterns stored in the storage unit 62.

Next, a method of upgrading the gas turbine 1 configured as has been described above and then changing the settings of the control system 14 will be described. FIG. 11 is a flowchart showing an example of the upgrade method for the gas turbine 1. As shown in FIG. 11, an operator upgrades the gas turbine 1 (step S10). In step S10, the operator makes settings so that the supply amount of cooling air supplied to the turbine 13 is reduced. Moreover, the operator replaces at least some of the components provided in the turbine 13 with those that can be cooled with the reduced supply amount of cooling air. In this embodiment, the first-stage and second-stage vanes 25 and the first-stage and second-stage blades 26 among the components of the turbine 13 are replaced with new components Next, the operator checks the post-upgrade supply amount of cooling air (step S20). In step S20, the operator may check the design value or use the measurement result of the flowmeter 55. Next, the operator checks the components that have been replaced in the upgrade (step S30). In step S30, the operator checks the types and locations of the replaced components by means of, for example, the stage numbers of the replaced vanes 25 and blades 26 and the manufacturing numbers of the replacement vanes 25 and blades 26. In the case where other components, such as the ring segments 27, are included in the replaced components, the types and locations thereof are checked in the same manner.

Next, the operator selects functions corresponding to the supply amount of cooling air checked in step S20 and the replaced components checked in step S30 from the data table of the plurality of patterns of the set temperature calculation function, the IGV opening degree calculation function, and the output calculation function that are used to control the gas turbine 1 (step S40). In step S40, the operator may access the storage unit 62 of the control system 14 from an external terminal etc. and select the functions by himself or herself by searching the data table. Alternatively, information on the supply amount of cooling air and the replaced components may be input into the control system 14, and the change unit 63 of the control system 14 may select the functions. Or the data table may be stored in advance in an external computer etc., and this external computer etc. may be used to select the functions.

Next, the operator changes the set temperature calculation function, the IGV opening degree calculation function, and the output calculation function to the functions selected in step S40 (step S50). In step S50, the operator may change the settings of these functions through an external computer etc., or the change unit 63 of the control system 14 may perform this change process.

If the gas turbine 1 is to be operated thereafter, the IGV control section 73 calculates the IGV opening degree set value relative to the measured output value of the gas turbine 1 that is the measurement result of the output meter 56, on the basis of the measured output value and the IGV opening degree calculation function. Then, the IGV control section 73 controls the opening degree of the inlet guide vane 22 on the basis of the calculation result. The IGV opening degree calculation function has been changed to the function that is in accordance with the contents of the upgrade, and for example, the curved line L1 has been changed to the curved line L2 as shown in FIG. 8. In this case, as shown in FIG. 8, the post-upgrade gas turbine 1 is controlled so that the IGV opening degree at the same gas turbine output becomes smaller than before the upgrade. Under this control, the amount of air suctioned into the compressor 11 decreases, and therefore, when the amount of fuel supplied is the same, the gas turbine 1 has a higher turbine inlet temperature than before the upgrade. Thus, a decrease in the turbine inlet temperature after the upgrade is avoided.

For example, when the gas turbine output has a value larger than P1 and smaller than P4 in the case where a partial-load operation is performed, the IGV opening degree set value on the curved line L2 shown in FIG. 8 is smaller than that on the pre-upgrade curved line L1 relative to the same gas turbine output. Thus, when the gas turbine 1 performs a partial-load operation, generation of carbon monoxide is suppressed as the turbine inlet temperature is higher than before the upgrade.

The temperature limit control part 76 calculates the exhaust gas set temperature relative to the pressure ratio of the compressor 11 on the basis of the pressure ratio and the set temperature calculation function, and calculates the exhaust gas temperature set value on the basis of the calculation result. The set temperature calculation function has been changed to the function that is in accordance with the contents of the upgrade, and for example, the rated temperature adjustment line T1 has been changed to the rated temperature adjustment line T2 as shown in FIG. 5. In this case, as shown in FIG. 5, the post-upgrade gas turbine 1 is controlled so that the exhaust gas set temperature at the same pressure ratio becomes higher than before the upgrade. Under this control, the turbine inlet temperature of the gas turbine 1 at the same pressure ratio becomes higher than before the upgrade. Thus, a decrease in the turbine inlet temperature after the upgrade is avoided.

The temperature limit control part 76 outputs the calculated exhaust gas set temperature to the IGV control section 73. The IGV control section 73 corrects the IGV opening degree set value on the basis of the exhaust gas set temperature output from the temperature limit control part 76. Thus, in the IGV control section 73, an IGV opening degree set value according to the contents of the upgrade is calculated.

The control variable generation part 81 calculates the gas turbine outputs Pa, Pb at the first reference temperature Ta and the second reference temperature Tb on the basis of the intake air temperature, the IGV opening degree set value, and the output calculation function, and calculates a control variable on the basis of the calculation result. The output calculation function has been changed to the function that is in accordance with the contents of the upgrade, and for example, the straight line S1 has been changed to the straight line S2 as shown in FIG. 10. In this case, as shown in FIG. 10, the post-upgrade gas turbine 1 is controlled so that the gas turbine output at the same intake air temperature becomes higher at each of the first reference temperature Ta and the second reference temperature Tb than before the upgrade. Under this control, the turbine inlet temperature of the gas turbine 1 at the same intake air temperature becomes higher than before the upgrade. Thus, a decrease in the turbine inlet temperature after the upgrade is avoided.

As has been described above, according to this embodiment, the set temperature calculation function, the IGV opening degree calculation function, and the output calculation function are changed to functions that are in accordance with the post-upgrade supply amount of cooling air and the replaced components. Thus, the IGV opening degree set value is calculated appropriately according to the contents of the upgrade. It is therefore possible to avoid a difference in the turbine inlet temperature at the same gas turbine output (or pressure ratio) between before and after the upgrade, and to avoid causing a difference in the operation conditions of the gas turbine 1 between before and after the upgrade.

In this embodiment, each of the set temperature calculation function, the IGV opening degree calculation function, and the output calculation function is changed, which makes it possible to more reliably avoid causing a difference in the operation conditions of the gas turbine 1 between before and after the upgrade.

The technical scope of the present invention is not limited to the above embodiment, but changes can be made as appropriate without departing from the gist of the invention. For example, in the above embodiment, the case where each of the set temperature calculation function, the IGV opening degree calculation function, and the output calculation function is changed after the upgrade has been described as an example. However, the present invention is not limited to this example, and at least the IGV opening degree calculation function should be changed. In this case, at least one of the set temperature calculation function and the output calculation function does not need to be changed.

In the above embodiment, the case where the upgrade is performed once has been described as an example. However, the present invention is not limited to this example, and the upgrade may be performed multiple times. In this case, the set temperature calculation function, the IGV opening degree calculation function, and the output calculation function are changed in each upgrade according to the supply amount of cooling air and the components to be replaced. In the case where the components are thus replaced in stages in the respective upgrades, the functions may also be changed in stages.

REFERENCE SIGNS LIST

A Air
A1 Compressed air
F Fuel
L1, L2 Curved line
S2, S2 Straight line
T1, T2 Rated temperature adjustment line
Pa Gas turbine output
Ta First reference temperature
Tb Second reference temperature
1 Gas turbine
11 Compressor
12 Combustor
13 Turbine
14 Control system
15 Generator
18 Rotor
19 Cooling air supply line
20 Cooling air control valve
22 Inlet guide vane
22a Vane body
22b IGV actuator
25 Vane
26 Blade
27 Ring segment
28 Casing

The invention claimed is:

1. An operation control method for a gas turbine comprising:
    a compressor that compresses air supplied through an air supply line;
    a combustor that is supplied with fuel and combusts compressed air compressed by the compressor;
    a turbine that is rotated by combustion gas generated by the combustor;
    a cooling air supply part that supplies part of the compressed air to the turbine as cooling air for the turbine; and
    an air intake valve that is provided in the air supply line and adjusts an amount of air supplied to the compressor,
    the operation control method comprising the steps of:
    calculating an opening degree set value of the air intake valve relative to a measured output value that is a measurement result of an output of the gas turbine, on the basis of the measured output value and a first function defining a relation between the measured output value and the opening degree set value;
    adjusting an opening degree of the air intake valve on the basis of the calculated opening degree set value;
    when an upgrade of reducing a supply amount of the cooling air supplied to the turbine and replacing components provided in the turbine with components adapted to the supply amount of cooling air has been performed, changing the first function according to the post-upgrade supply amount of cooling air and the replaced components;
    obtaining a set temperature that is preset for exhaust gas discharged from the turbine, relative to a pressure ratio of the compressor, on the basis of the pressure ratio and a second function defining a relation between the pressure ratio and the set temperature; and
    when the upgrade has been performed, changing the second function to a function that is calculated from a first correction value and a second correction value, the first correction value corresponding to a further decrease in an exhaust gas temperature due to thermal expansion caused by a rise in the pressure ratio, the second correction value corresponding to a further rise in the exhaust gas temperature caused by a decrease in the supply amount of cooling air.

2. The operation control method for a gas turbine according to claim 1, further comprising a step of, on the basis of the set temperature that is calculated on the basis of the changed second function, correcting the opening degree set value that is calculated on the basis of the changed first function.

3. The operation control method for a gas turbine according to claim 1, wherein
    the gas turbine has a plurality of fuel supply lines through which the fuel is supplied to the combustor, and
    the operation control method further comprises a step of calculating a control variable corresponding to a turbine inlet temperature, on the basis of an intake air temperature that is a measurement result of a temperature of the air supplied through the air supply line, and on the basis of a third function defining a relation between the intake air temperature and the output of the gas turbine, and then setting a distribution ratio of an amount of the fuel supplied to the plurality of fuel supply lines on the basis of the calculated control variable.

4. The operation control method for a gas turbine according to claim 3, further comprising a step of, when the upgrade has been performed, changing the third function according to the post-upgrade supply amount of cooling air and the replaced components.

5. The operation control method for a gas turbine according to claim 1, wherein, compared with the unchanged first function, the changed first function is set so that the opening degree set value when the gas turbine performs a partial-load operation at an output lower than a rated output becomes smaller after the upgrade than before the upgrade.

6. The operation control method for a gas turbine according to claim 1, wherein the components include at least one of a plurality of blades and a plurality of vanes that are provided in the turbine.

7. An upgrade method for a gas turbine comprising:
    a compressor that compresses air supplied through an air supply line;
    a combustor that is supplied with fuel and combusts compressed air compressed by the compressor;

a turbine that is rotated by combustion gas generated by the combustor;

a cooling air supply part that supplies part of the compressed air to the turbine as cooling air for the turbine;

an air intake valve that is provided in the air supply line and adjusts an amount of air supplied to the compressor; and a control system that calculates an opening degree set value of the air intake valve relative to a measured output value that is a measurement result of a gas turbine output, on the basis of the measured output value and a first function defining a relation between the measured output value and the opening degree set value; adjusts an opening degree of the air intake valve on the basis of the calculated opening degree set value; and obtains a set temperature that is preset for exhaust gas discharged from the turbine, relative to a pressure ratio of the compressor, on the basis of the pressure ratio and a second function defining a relation between the pressure ratio and the set temperature, the upgrade method comprising:

performing an upgrade of reducing a supply amount of the cooling air supplied to the turbine and replacing at least some of components provided in the turbine with components adapted to the supply amount of cooling air;

changing the first function according to the post-upgrade supply amount of cooling air and the replaced components; and changing the second function to a function that is calculated from a first correction value and a second correction value, the first correction value corresponding to a further decrease in an exhaust gas temperature due to thermal expansion caused by a rise in the post-upgrade pressure ratio, the second correction value corresponding to a further rise in the exhaust gas temperature caused by a decrease in the supply amount of cooling air.

8. A setting change method for a gas turbine control system that controls a gas turbine comprising:

a compressor that compresses air supplied through an air supply line;

a combustor that is supplied with fuel and combusts compressed air compressed by the compressor;

a turbine that is rotated by combustion gas generated by the combustor;

a cooling air supply part that supplies part of the compressed air to the turbine as cooling air for the turbine; and an air intake valve that is provided in the air supply line and adjusts an amount of air supplied to the compressor, the gas turbine control system calculating an opening degree set value of the air intake valve relative to a measured output value that is a measurement result of an output of the gas turbine, on the basis of the measured output value and a first function defining a relation between the measured output value and the opening degree set value; adjusting an opening degree of the air intake valve on the basis of the calculated opening degree set value; and obtaining a set temperature that is preset for exhaust gas discharged from the turbine, relative to a pressure ratio of the compressor, on the basis of the pressure ratio and a second function defining a relation between the pressure ratio and the set temperature, the setting change method comprising, when an upgrade of reducing a supply amount of the cooling air supplied to the turbine and replacing at least some of components provided in the turbine with components adapted to the supply amount of cooling air has been performed, changing the first function according to the post-upgrade supply amount of cooling air and the replaced components, and changing the second function to a function that is calculated from a first correction value and a second correction value, the first correction value corresponding to a further decrease in an exhaust gas temperature due to thermal expansion caused by a rise in the post-upgrade pressure ratio, the second correction value corresponding to a further rise in the exhaust gas temperature caused by a decrease in the supply amount of cooling air.

9. The operation control method for a gas turbine according to claim 2, wherein the gas turbine has a plurality of fuel supply lines through which the fuel is supplied to the combustor, and the operation control method further comprises a step of calculating a control variable corresponding to a turbine inlet temperature, on the basis of an intake air temperature that is a measurement result of a temperature of the air supplied through the air supply line, and on the basis of a third function defining a relation between the intake air temperature and the output of the gas turbine, and then setting a distribution ratio of an amount of the fuel supplied to the plurality of fuel supply lines on the basis of the calculated control variable.

10. The operation control method for a gas turbine according to claim 9, further comprising a step of, when the upgrade has been performed, changing the third function according to the post-upgrade supply amount of cooling air and the replaced components.

* * * * *